Feb. 21, 1950 K. C. WHITEFIELD 2,498,516
FLOW CONTROL NOZZLE
Filed Feb. 4, 1948 2 Sheets-Sheet 1
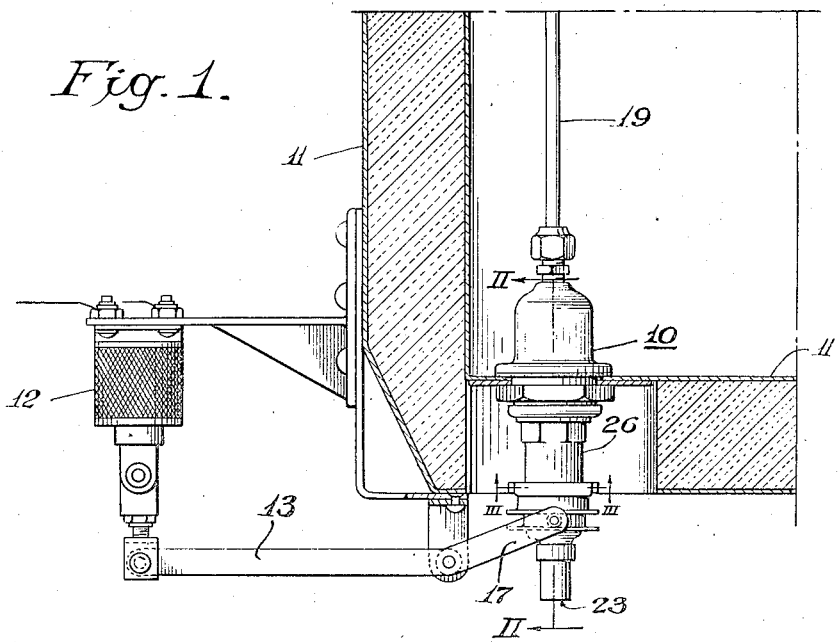
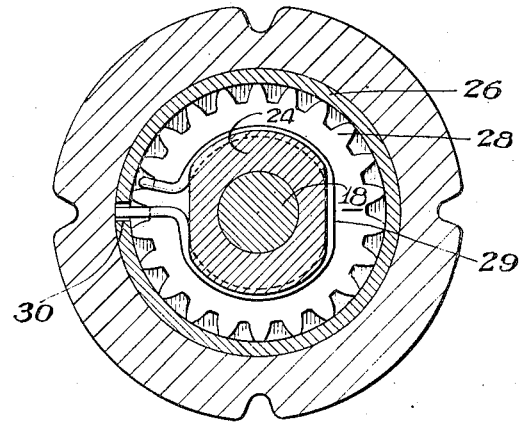
WITNESSES:
INVENTOR
Kyle C. Whitefield
BY
ATTORNEY Patented Feb. 21, 1950

2,498,516

UNITED STATES PATENT OFFICE 2,498,516

FLOW CONTROL NOZZLE

Kyle C. Whitefield, Longmeadow, Mass., assignor to Westinghouse Electric Corporation, East Pittsburgh, Pa., a corporation of Pennsylvania Application February 4, 1948, Serial No. 6,299

6 Claims. (Cl. 138—43)

1

This invention relates to flow control mechanisms and particularly to a mechanism adapted to control the flow of liquid from a source under pressure whereby the pressure of the liquid is reduced by the mechanism at its discharge end under constant delivery conditions.

The invention will be here described as a nozzle for controlling flow of carbonated water from a source under pressure to a cup or other receptacle. An important feature of such a nozzle is that the flow be controlled at a uniform rate so that the discharge is a constant quantity in a specified time. Additionally, the construction should be such that the maximum carbonation is preserved in the cup or receptacle; in other words, the construction should be such that the proper flow control is ensured with a minimum loss of carbonation. Such an effect can be best obtained by using known principles of capillary flow approaching a non-turbulent effect.

However, structures as heretofore proposed have required fine machining of related parts with such close tolerances that their production on a reasonable basis has been almost prohibitive in cost. In addition, such nozzles as have been made are so constructed that they are almost inaccessible for service, cleaning and adjustment.

Objects of this invention are, therefore, to preserve the desired flow characteristics in a structure quite easily made and having all the desired features of easy servicing, cleaning and adjustability.

Other objects are effected by the invention as will be apparent from the following description and claims taken in connection with the accompanying drawing, forming a part of this application, in which:

Fig. 1 is an elevation partly in section showing a flow control nozzle associated with its operating mechanism and applied to a tank;

Fig. 3 is a section on line III—III of Fig. 2.

Figure 2:
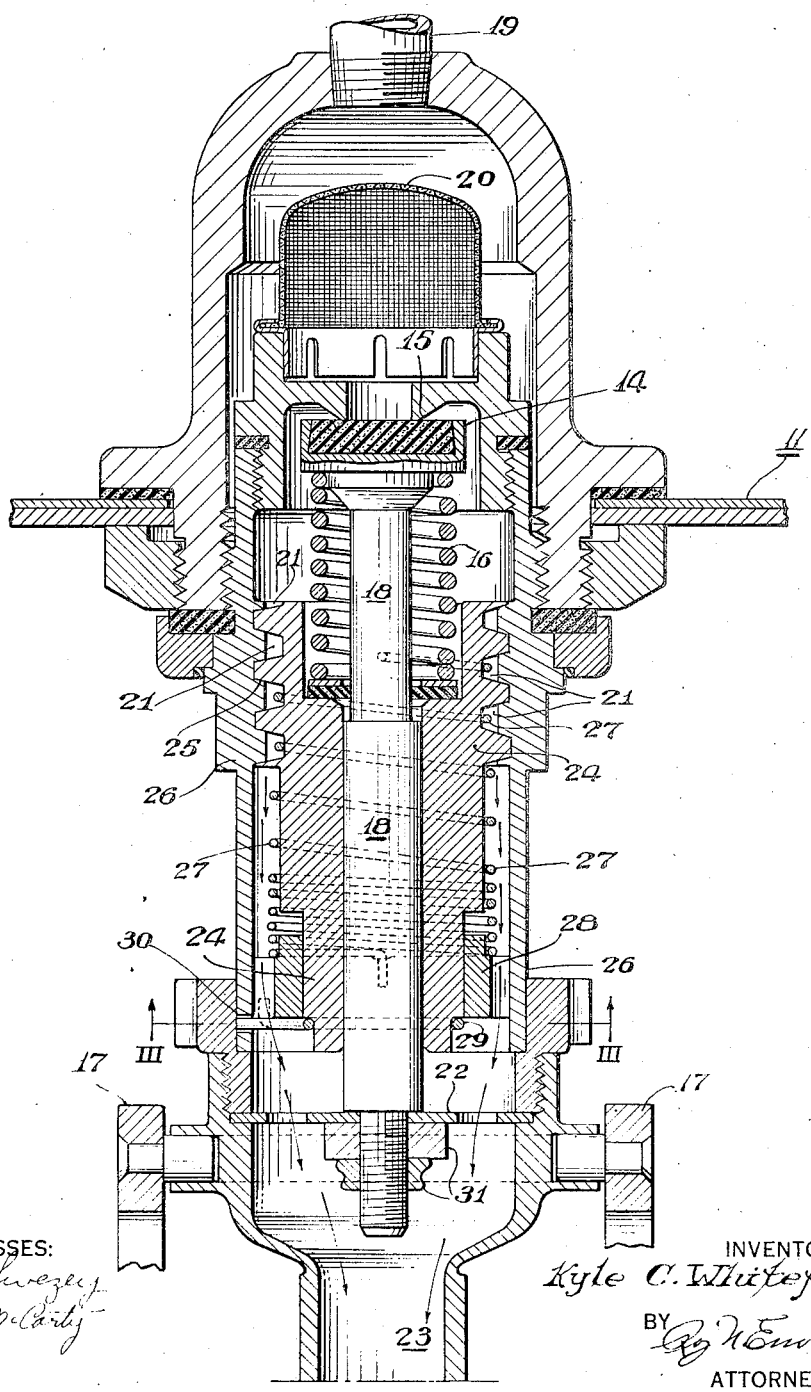
Fig. 2 is a section on line II—II of Fig. 1 and showing on an enlarged scale the details of the improved nozzle construction.

In Fig. 1 the nozzle mechanism 10 is shown applied to an insulated tank 11. The operating mechanism for the nozzle is here shown as a solenoid 12 operating through a lever 13 to control a discharge valve 14. This valve is normally biased to its seat 15 by a spring 16. However, when the solenoid 12 is energized, the lever 13 acting through a yoke 17 depresses stem 18 and unseats valve 14, thereby permitting carbonated water to flow from a source 19 through a filter 20 and past the unseated valve to flow control passage 21, to be later described, and past a baffle plate 22 to the discharge orifice 23.

The flow control passage 21 is comprised by a threaded member 24 which fits into a correspondingly threaded bore 25 provided internally of the main body member 26. The two threaded portions are so cut that the passageway 21 is formed between the threads providing in effect a single continuous passage between the discharge side of valve 14 and the discharge passage 23. This passageway 21 is carefully calculated both as to length and volume to give the desired flow characteristics to the carbonated beverage.

However, manufacturing inaccuracies do occur and it is, therefore, desirable to provide a simple adjustment by which the rate of flow through the passageway 21 can be controlled to give the desired operating results. To this end I provide a coiled spring 27 which is adapted at its upper end to be engaged in the passageway 21 for varying distances as conditions may require. Thus, the effect of the spring is to control the volume of flow through the passageway. For adjusting the spring it is fixed at its lower end to a spur gear 28. The latter gear surrounds the lower end of the member 24 and is rotatable with respect to that member by the use of a suitable tool. Once the spur gear and its attached spring has been properly located it is locked by a cotter pin 29, leaving one end engaging a tooth of the gear and another end projecting into a hole 30 provided in the body member 26.

By the foregoing construction it is obvious that the entire assembly can be readily disassembled by first detaching yoke 17 then removing lock nuts 31 on the lower end of valve stem 18. This permits removal of baffle plate 22, whereupon the cotter pin 29 can be removed and the spur gear likewise removed with its attached spring 27. Thus, the threaded parts 25 and 26 can now be separated and their surfaces easily cleaned.

While I have shown my invention in but one form, it will be obvious to those skilled in the art that it is not so limited, but is susceptible of various changes and modifications without departing from the spirit thereof.

What I claim is:

1. A device for controlling flow of a liquid from a source under pressure at a controlled rate comprising an outer cylindrical member, an inner cylindrical member enclosed in the outer member, one of said members having a helical groove adjacent a surface of the other member to provide a flow controlling passage between the members, a coiled spring cooperating with the groove for adjustably controlling the rate of flow through said passage, and inlet and discharge passages cooperating with said members for directing liquid flow through said groove.

2. A device for controlling flow of a liquid from a source under pressure at a controlled rate comprising an outer cylindrical member, an inner cylindrical member enclosed in the outer member, one of said members having a helical groove adjacent a surface of the other member to provide a flow controlling passage between the members, a coiled spring having a free end disposed in said groove and having its other end attached to an adjustable member cooperating with the groove for adjustably controlling the rate of flow through said passage, and inlet and discharge passages cooperating with said members for directing liquid flow through said groove.

3. A device for controlling flow of a liquid from a source under pressure at a controlled rate comprising an outer cylindrical member, an inner cylindrical member enclosed in the outer member, one of said members having a helical groove adjacent a surface of the other member to provide a flow controlling passage between the members, a coiled spring having a free end disposed in said groove and having its other end attached to an adjustable spur gear cooperating with the groove for adjustably controlling the rate of flow through said passage, and inlet and discharge passages cooperating with said members for directing liquid flow through said groove.

4. A device for controlling flow of a liquid from a source under pressure at a controlled rate comprising an outer cylindrical member, an inner cylindrical member enclosed in the outer member, one of said members having a helical groove adjacent a surface of the other member to provide a flow controlling passage between the members, a coiled spring having a free end disposed in said groove and having its other end attached to an adjustable member cooperating with the groove for adjustably controlling the rate of flow through said passage, and inlet and discharge passages cooperating with said members for directing liquid flow through said groove and detachable means for locking said adjustable member in a selected position.

5. A device for controlling flow of a liquid from a source under pressure, said device comprising a member having a cylindrical bore, a cylindrical member disposed in said bore and engaging the side walls defining said bore, one of said members having a helical groove in the cylindrical surface adjacent the cylindrical surface of the other member to provide a helical passage between the members, a helically coiled rod having a free end disposed in said groove, said coiled rod being rotatable on its axis to project variable portions of said rod into said groove for adjustably controlling the rate of flow therethrough, and inlet and discharge passages cooperating with said members for directing liquid flow through said groove.

6. The device defined in claim 5 including means for rotating said coiled rod on its axis.

KYLE C. WHITEFIELD.

REFERENCES CITED

The following references are of record in the file of this patent:

UNITED STATES PATENTS

| Number | Name | Date |
|---|---|---|
| 1,836,682 | Ray | Dec. 15, 1931 |
| 2,323,115 | Bryant | June 29, 1943 |

FOREIGN PATENTS

| Number | Country | Date |
|---|---|---|
| 498,060 | Great Britain | Jan. 3, 1939 |